(12) United States Patent
Silveira et al.

(10) Patent No.: US 11,599,538 B2
(45) Date of Patent: Mar. 7, 2023

(54) ASSOCIATING SEARCH RESULTS, FOR A CURRENT QUERY, WITH A RECENTLY EXECUTED PRIOR QUERY

(71) Applicant: Oracle International Corporation, Redwood Shores, CA (US)

(72) Inventors: Laney Jude Silveira, Foster City, CA (US); Richard Herbert Miller, Hillsborough, CA (US); Allison Marie Wayne, Wakefield, MA (US); Kathleen Maguire Candland, San Francisco, CA (US); Carmen Ximena D'Arlach, Austin, TX (US)

(73) Assignee: Oracle International Corporation, Redwood Shores, CA (US)

( * ) Notice: Subject to any disclaimer, the term of this patent is extended or adjusted under 35 U.S.C. 154(b) by 27 days.

(21) Appl. No.: 17/017,270

(22) Filed: Sep. 10, 2020

(65) Prior Publication Data

US 2021/0081418 A1 Mar. 18, 2021

Related U.S. Application Data

(60) Provisional application No. 62/900,231, filed on Sep. 13, 2019.

(51) Int. Cl.
*G06F 16/2453* (2019.01)
*G06F 16/2455* (2019.01)
(Continued)

(52) U.S. Cl.
CPC ...... *G06F 16/24539* (2019.01); *G06F 16/217* (2019.01); *G06F 16/248* (2019.01);
(Continued)

(58) Field of Classification Search
CPC ......... G06F 16/24539; G06F 16/24568; G06F 16/24561; G06F 16/24578; G06F 16/217; G06F 16/248; G06F 16/288
See application file for complete search history.

(56) References Cited

U.S. PATENT DOCUMENTS

7,693,904 B2 * 4/2010 Choi ................... G06F 16/951
707/738
7,725,422 B2 * 5/2010 Ryan ..................... G06F 16/30
707/709
(Continued)

*Primary Examiner* — Miranda Le
(74) *Attorney, Agent, or Firm* — Invoke (57) ABSTRACT

Techniques for associating a selected search result, for a current query, with a recently executed prior query are disclosed. The system receives a first query from a user and presents a first set of search results. The system receives a second query from the user, subsequent to presenting the first set of search results, and presents a second set of search results. The system determines that a user selects a particular search result from the second set of search results. The system determines an association between the first query and the second query. Responsive to determining that the user selected the particular search result and the association between the first query and the second query, the system associates the particular search result with the first query. Subsequently, the system receives a new request for execution of the first query and, in response, presents at least the particular search result.

20 Claims, 6 Drawing Sheets

(51) Int. Cl.
*G06F 16/28* (2019.01)
*G06F 16/248* (2019.01)
*G06F 16/21* (2019.01)
*G06F 16/2457* (2019.01)

(52) U.S. Cl.
CPC ............... *G06F 16/24561* (2019.01); *G06F 16/24568* (2019.01); *G06F 16/24578* (2019.01); *G06F 16/288* (2019.01)

(56) References Cited

U.S. PATENT DOCUMENTS

| | | | |
|---|---|---|---|
| 8,019,749 B2* | 9/2011 | Leban | G06F 16/9038 707/713 |
| 8,930,356 B2* | 1/2015 | Kawale | G06F 16/951 707/728 |
| 9,053,187 B2* | 6/2015 | Bennett | G06F 3/0482 |
| 9,104,764 B1* | 8/2015 | Garg | G06F 16/9574 |
| 9,116,963 B2* | 8/2015 | Brukman | G06F 16/248 |
| 9,330,201 B2* | 5/2016 | Parikh | G06Q 30/0601 |
| 9,378,247 B1* | 6/2016 | Das | G06F 16/2457 |
| 9,471,669 B2* | 10/2016 | Bilinski | G06F 16/2455 |
| 2005/0160082 A1* | 7/2005 | Dawson | G06F 16/335 |
| 2008/0091670 A1* | 4/2008 | Ismalon | G06F 16/3322 |
| 2011/0066618 A1* | 3/2011 | Sigurbjornsson | G06F 16/9535 707/739 |

\* cited by examiner

ASSOCIATING SEARCH RESULTS, FOR A CURRENT QUERY, WITH A RECENTLY EXECUTED PRIOR QUERY

INCORPORATION BY REFERENCE; DISCLAIMER

This application is hereby incorporated by reference: application No. 62/900,231 filed on Sep. 13, 2019. The Applicant hereby rescinds any disclaimer of claim scope in the parent application or the prosecution history thereof and advises the USPTO that the claims in this application may be broader than any claim in the parent application.

TECHNICAL FIELD

The present disclosure relates to query association. In particular, the present disclosure relates to associating a selected search result, for a current query, with a recently executed prior query.

BACKGROUND

Conventionally, search results are determined for queries based on a match between one or more query terms and one or more terms found in the search results. Accordingly, a particular query will always return the same results until a new data set is indexed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. QUERY MANAGEMENT ARCHITECTURE
3. ASSOCIATING SEARCH RESULTS, FOR A CURRENT QUERY, WITH A RECENTLY EXECUTED PRIOR QUERY
4. EXAMPLE EMBODIMENT
5. MISCELLANEOUS; EXTENSIONS
6. HARDWARE OVERVIEW

1. General Overview

One or more embodiments map search results to queries based on detected user behavior. In particular, a system maps search results, generated in response to one query, with a previously executed query in response to determining a relationship between the two queries based on detected user behavior.

Users typically execute a sequence of queries until a particular desired search result is found. A user may continuously modify and execute queries until the particular desired search result is found. The sequence of queries that are executed in search of the same particular search result typically share one or more attributes. As an example, the sequence of queries may be executed within a certain time window from one another. The sequence of queries may share one or more common query terms. The sequence of queries may include terms that are related to one another.

One or more embodiments determine that two queries are related based on the attributes shared across the two queries meeting a query relationship criteria. As an example, the query relationship criteria may require execution of the two queries within x seconds of each other and one common query term shared across both queries. In another example, the query relationship criteria may require execution of the two queries within x seconds and no search result being selected from the results presented in response to the earlier-executed query (indicative of the user continuing the search for the desired search result using related queries). Two queries may also be determined to be related if each of the two queries is determined to be related to a same third query.

In an embodiment, determining that two queries are related includes finding sufficient shared attributes between the two queries in a threshold number of query execution sequences. As an example, if 1000 executions of a first query are each followed by execution of the second query, the first query may be determined to be related to the second query. In another embodiment, if a threshold percentage of executions of a first query are each followed by execution of the second query, then the first query is determined to be related to the second query. As an example, if at least 70% of executions of the first query are each followed by execution of the second query, then the first query and second query are determined to be related.

If two queries are determined to be related, then search results from a later-executed query are mapped to an earlier-executed query. Specifically, a particular search result, that was selected by the user from a set of search results that are presented in response to the later-executed query, is mapped to an earlier-executed query. A consequence of the mapping operation is that the particular search result (presented in the search results of the later-executed query) is now also included in a set of results presented in response to any future executions of the earlier-executed query.

One or more embodiments described in this Specification and/or recited in the claims may not be included in this General Overview section.

2. Query Management Architecture

Figure 1:
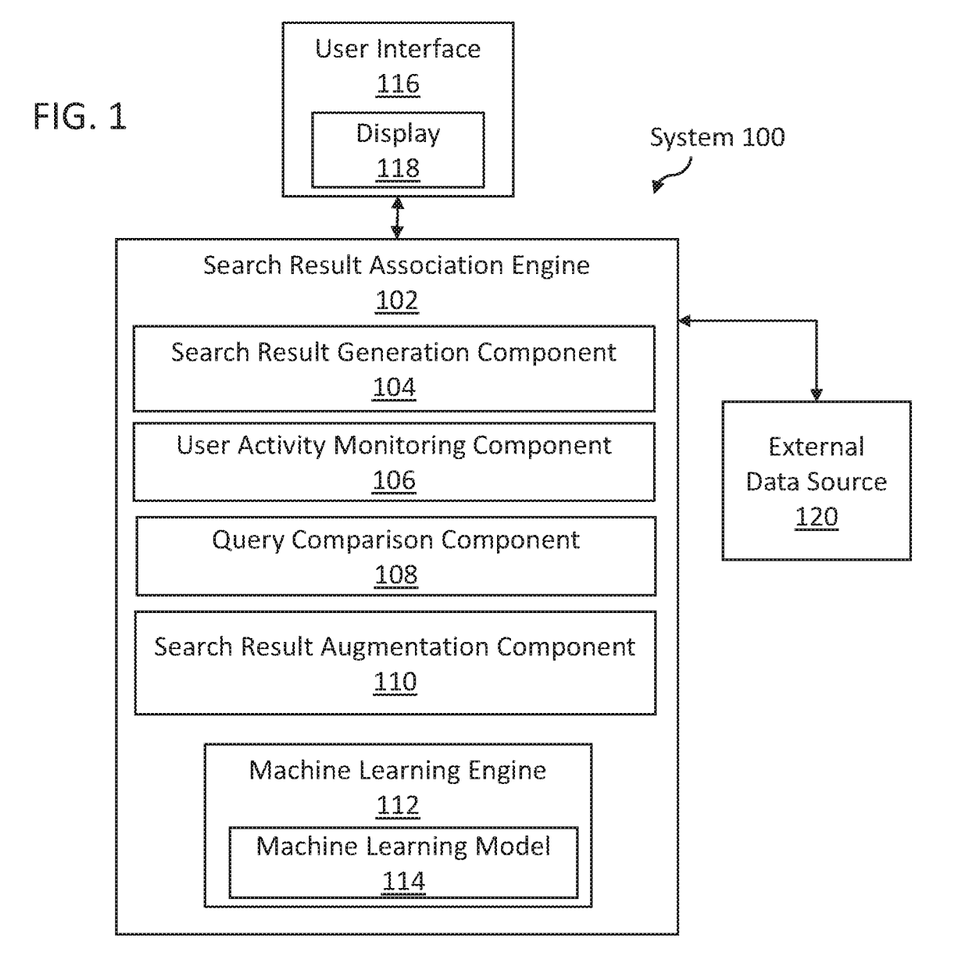
FIG. 1 illustrates a system in accordance with one or more embodiments.

FIG. 1 illustrates a system 100 in accordance with one or more embodiments. As illustrated in FIG. 1, system 100 includes a search result association engine 102, a user interface 116, an external data source 120, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

In one or more embodiments, the user interface 116 refers to hardware and/or software configured to facilitate communications between a user and the search result association engine 102. The user interface 116 may be used by a user who accesses an interface (e.g., a dashboard interface) for work and/or personal activities. The user interface 116 may be associated with one or more devices for presenting visual media, such as a display 118, including a monitor, a television, a projector, and/or the like. User interface 116 renders user interface elements and receives input via user interface elements. Examples of interfaces include a graphical user interface (GUI), a command line interface (CLI), a haptic interface, and a voice command interface. Examples of user interface elements include checkboxes, radio buttons, menus, dropdown lists, list boxes, buttons, toggles, text fields, date and time selectors, command lines, sliders, pages, and forms.

In an embodiment, different components of the user interface 116 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 116 is specified in one or more other languages, such as Java, C, or C++.

In one or more embodiments, a search result association engine 102 refers to hardware and/or software configured to perform operations described herein for selecting query results to display to a user. Examples of operations for selecting query results to display to a user are described below with reference to FIG. 2.

In an embodiment, the search result association engine 102 includes a search result generation component 104. A search result generation component 104 may refer to hardware and/or software configured to perform operations described herein (including such operations as may be incorporated by reference) for recognizing input from a user.

In an embodiment, the search result association engine 102 includes a user activity monitoring component 106. A user activity monitoring component 106 may refer to hardware and/or software configured to perform generation and/or identification of query suggestions.

In an embodiment, the search result association engine 102 includes a query comparison component 108. A query comparison component 108 may refer to hardware and/or software configured to perform generation and/or identification of query suggestions.

In an embodiment, the search result association engine 102 includes a search result augmentation component 110. A search result augmentation component 110 may refer to hardware and/or software configured to perform generation and/or identification of query suggestions In an embodiment, one or more components of the search result association engine 102 use a machine learning engine 112. In particular, the machine learning engine 112 may be used to determine a relationship between a selected search result (e.g., from among a plurality of search results returned by the search result generation component 104) and a previously-entered query. Machine learning includes various techniques in the field of artificial intelligence that deal with computer-implemented, user-independent processes for solving problems that have variable inputs.

In some embodiments, the machine learning engine 112 trains a machine learning model 114 to perform one or more operations. Training a machine learning model 114 uses training data to generate a function that, given one or more inputs to the machine learning model 114, computes a corresponding output. The output may correspond to a prediction based on prior machine learning. In an embodiment, the output includes a label, classification, and/or categorization assigned to the provided input(s). The machine learning model 114 corresponds to a learned model for performing the desired operation(s) (e.g., labeling, classifying, and/or categorizing inputs). A search engine association engine 102 may use multiple machine learning engines 112 and/or multiple machine learning models 114 for different purposes.

In an embodiment, the machine learning engine 112 may use supervised learning, semi-supervised learning, unsupervised learning, reinforcement learning, and/or another training method or combination thereof. In supervised learning, labeled training data includes input/output pairs in which each input is labeled with a desired output (e.g., a label, classification, and/or categorization), also referred to as a supervisory signal. In semi-supervised learning, some inputs are associated with supervisory signals and other inputs are not associated with supervisory signals. In unsupervised learning, the training data does not include supervisory signals. Reinforcement learning uses a feedback system in which the machine learning engine 108 receives positive and/or negative reinforcement in the process of attempting to solve a particular problem (e.g., to optimize performance in a particular scenario, according to one or more predefined performance criteria). In an embodiment, the machine learning engine 112 initially uses supervised learning to train the machine learning model 114 and then uses unsupervised learning to update the machine learning model 114 on an ongoing basis.

In an embodiment, a machine learning engine 112 may use many different techniques to label, classify, and/or categorize inputs. A machine learning engine 112 may transform inputs into feature vectors that describe one or more properties ("features") of the inputs. The machine learning engine 112 may label, classify, and/or categorize the inputs based on the feature vectors. Alternatively or additionally, a machine learning engine 112 may use clustering (also referred to as cluster analysis) to identify commonalities in the inputs. The machine learning engine 112 may group (i.e., cluster) the inputs based on those commonalities. The machine learning engine 112 may use hierarchical clustering, k-means clustering, and/or another clustering method or combination thereof. For example, the machine learning engine 112 may receive, as inputs, one or more parsed query terms, and may identify one or more additional parsed query terms for inclusion in a search based on commonalities among the received parsed query terms. In an embodiment, a machine learning engine 112 includes an artificial neural network. An artificial neural network includes multiple nodes (also referred to as artificial neurons) and edges between nodes. Edges may be associated with corresponding weights that represent the strengths of connections between nodes, which the machine learning engine 112 adjusts as machine learning proceeds. Alternatively or additionally, a machine learning engine 112 may include a support vector machine. A support vector machine represents inputs as vectors. The machine learning engine 112 may label, classify, and/or categorizes inputs based on the vectors. Alternatively or additionally, the machine learning engine 112 may use a naïve Bayes classifier to label, classify, and/or categorize inputs. Alternatively or additionally, given a particular input, a machine learning model may apply a decision tree to predict an output for the given input. Alternatively or additionally, a machine learning engine 112 may apply fuzzy logic in situations where labeling, classifying, and/or categorizing an input among a fixed set of mutually exclusive options is impossible or impractical. The aforementioned machine learning model 114 and techniques are discussed for exemplary purposes only and should not be construed as limiting one or more embodiments.

In an embodiment, as a machine learning engine 112 applies different inputs to a machine learning model 114, the corresponding outputs are not always accurate. As an example, the machine learning engine 112 may use supervised learning to train a machine learning model 114. After training the machine learning model 114, if a subsequent input is identical to an input that was included in labeled training data and the output is identical to the supervisory signal in the training data, then output is certain to be accurate. If an input is different from inputs that were included in labeled training data, then the machine learning engine 112 may generate a corresponding output that is inaccurate or of uncertain accuracy. In addition to producing a particular output for a given input, the machine learning engine 112 may be configured to produce an indicator representing a confidence (or lack thereof) in the accuracy of the output. A confidence indicator may include a numeric score, a Boolean value, and/or any other kind of indicator that corresponds to a confidence (or lack thereof) in the accuracy of the output.

In an embodiment, the search result association engine 102 is configured to receive data from one or more external data sources 120. An external data source 120 refers to hardware and/or software operating independent of the search result association engine 102. For example, the hardware and/or software of the external data source 120 may be under control of a different entity (e.g., a different company or other kind of organization) than an entity that controls the query suggestion engine. An external data source 120 may supply search results in response to a query. An example of an external data source 120 supplying data to a search result association engine 102 may include a third party search engine. Many different kinds of external data sources 120 may supply many different kinds of data.

In an embodiment, search result association engine 102 is configured to retrieve data from an external data source 120 by 'pulling' the data via an application programming interface (API) of the external data source 120, using user credentials that a user has provided for that particular external data source 120. Alternatively or additionally, an external data source 120 may be configured to 'push' data to the search result association engine 102 via an API of the query suggestion service, using an access key, password, and/or other kind of credential that a user has supplied to the external data source 120. A search result association engine 102 may be configured to receive data from an external data source 120 in many different ways.

In an embodiment, the system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
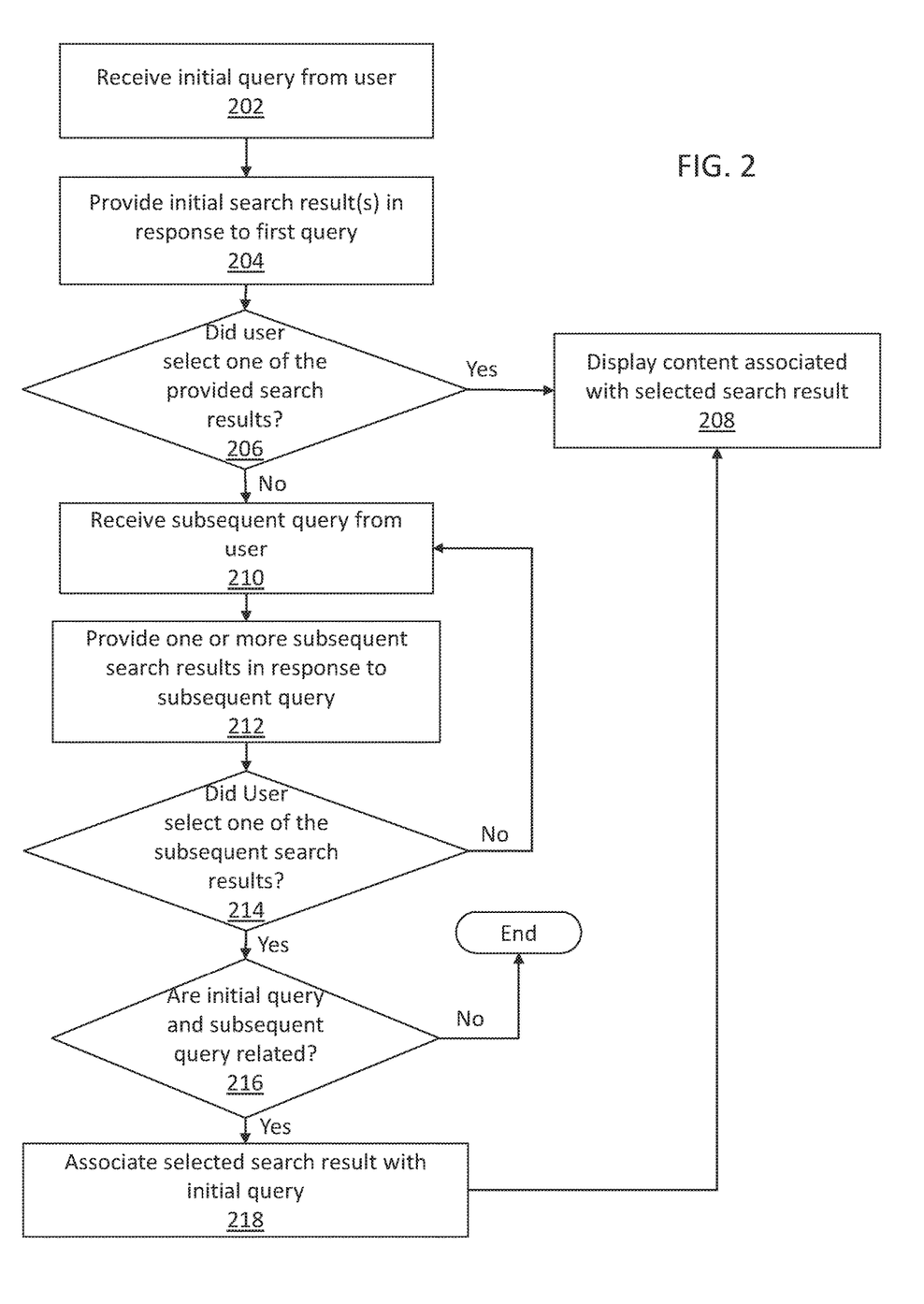
FIG. 2 illustrates an example set of operations for associating a selected search result, for a current query, with a recently executed prior query in accordance with one or more embodiments.

3. Associating Search Results, for a Current Query, with a Recently Executed Prior Query FIG. 2 illustrates an example set of operations for associating a selected search result, for a current query, with a recently executed prior query in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.\

In an embodiment, a system (e.g., one or more components of system 100 illustrated in FIG. 1) may receive an initial query from a user (Operation 202). In some embodiments, the query may be received as a text query (e.g., via a text input box). Alternatively, the query may be received as an audio query, or via other input methods.

In an embodiment, the system may generate one or more initial search results in response to the received initial query. At least a subset of the one or more initial search results may be provided to the user (Operation 204). In embodiments, the one or more initial search results may be provided via a user interface. For example, the one or more initial search results may be provided via a graphical or textual interface.

In embodiments, generating the initial search results may include parsing the initial search query to determine one or more initial query terms. Each of the one or more initial query terms may be assigned a particular weight based on the format of the initial query. As particular examples of terms receiving different weights, a query term appearing first in the parsed query may be provided with a higher weight than a query term appearing at the end of the parsed query, query terms enclosed in quotation marks may receive a higher weight than query terms not enclosed in quotation marks. Alternatively, each query term may receive equal weight. The initial search results may be determined and/or ranked based on the weighted initial query terms.

In an embodiment, the system may determine if a user selects one of the provided initial search results (Operation 206). In some embodiments, the system can track user activity to determine if the user selects one of the provided search results. In some embodiments, the system can monitor user activity to determine if the user selects a command such as "back" or "reload" to determine that the user did not select any of the provided search results.

In embodiments, responsive to determining that a user selected one of the search results, the system may display content associated with the selected search result (Operation 208). In some embodiments, displaying the content can comprise displaying graphical data, textual data, video data, audio data, and/or the like.

In embodiments, after determining that the user did not select one of the search results provided in response to the first received query, the system may receive a subsequent query from the user (Operation 210). In some embodiments, the subsequent query may be immediately subsequent to the first query. Alternatively, there may be one or more intervening queries received between the first query and the subsequent query.

In embodiments, the system may generate one or more subsequent search results in response to the received subsequent query. At least a subset of the one or more subsequent search results may be provided to the user (Operation 212). In embodiments, the one or more subsequent search results may be provided via a user interface. For example, the one or more subsequent search results may be provided via a graphical or textual interface.

In embodiments, generating the subsequent search results may include parsing the subsequent search query to determine one or more query terms. Each of the one or more query terms may be assigned a particular weight based on the format of the subsequent query. As particular examples of terms receiving different weights, a query term appearing first in the parsed query may be provided with a higher weight than a query term appearing at the end of the parsed query, query terms enclosed in quotation marks may receive a higher weight than query terms not enclosed in quotation marks. Alternatively, each query term may receive equal weight. The subsequent search results may be determined and/or ranked based on the weighted query terms.

In an embodiment, the system may determine if a user selects one of the provided subsequent search results (Operation 214). In some embodiments, the system can track user activity to determine if the user selects one of the provided subsequent search results. In some embodiments, the system can monitor user activity to determine if the user selects a command such as "back" or "reload" to determine that the user did not select any of the provided subsequent search results.

Responsive to determining that the user did not select any of the subsequent search results, the system may return to Operation 210. Alternatively, if the system determines that the user selected one of the subsequent search results, (e.g., the chronologically first selected search result is selected since the initial query was received at the system) the system may determine whether the initial query and the subsequent query are related (Operation 216).

In some embodiments, a system administrator or other user may review the initial query and the subsequent query to determine that the initial query and the subsequent query are related. The user may determine that the subsequent query is actually related to the initial query. In embodiments, determine that the initial query and the subsequent query are related may include reviewing a provisional determination made by the system.

In some embodiments, the determination that the initial query and the subsequent query are related can be formed without human interaction (e.g., based on the system determining that the initial query and the subsequent query are related).

For example, the system may increment a counter in response to determining that the user entered the subsequent query following entry of the initial query. The system may determine that the initial query and the subsequent query are related in response to determining that the counter exceeds a threshold. The threshold may be an absolute number of users (e.g., a specific number, such as 10, 100, or 1000) and/or a particular percentage of users (e.g., 0.1%, 0.5%, 1%, or 5% of users) who enter the initial query also enter the subsequent query.

In some embodiments, determining whether the initial query and the subsequent query are related may include parsing the initial query to determine one or more initial query terms and parsing the subsequent query to determine one or more subsequent query terms. The system may further compare the one or more initial query terms with the one or more subsequent query terms to determine whether there is a correspondence between the initial query terms and the subsequent query terms. If the system determines a correspondence, the system may determine that the initial query and the subsequent query are related. For example, determining whether the initial query and the subsequent query are related may comprise determining a semantic distance between the initial query and the subsequent query based on one or more parsed query terms. When the sematic distance between the initial query and the subsequent query is below a particular threshold, the system may determine that the initial query and the subsequent query are related.

In some embodiments, determining whether the initial query and the subsequent query are related may include determining that the initial query immediately precedes the subsequent query. That is, determining whether the initial query and the subsequent query are related may include determining that the initial query and the subsequent query are entered consecutively.

In some embodiments, determining whether the initial query and the subsequent query are related may include determining a first time at which the system received the first query and determining a second time at which the system received the subsequent query. The system may determine a time differential indicating an amount of time that elapsed between receiving the first query and receiving the subsequent query. If the determined time differential is less than a predetermined time interval (e.g., 10 seconds, 15 seconds), the system may determine that the first query and the subsequent query are related. Alternatively, if the determined time differential is greater than the predetermined time interval, the system may determine that the initial query and the subsequent query are less likely to be related.

In some embodiments, determining whether the initial query and the subsequent query are related may include determining whether the user opened and/or interacted with another application between entry of the initial query and entry of the subsequent query. The opening of (or interaction with) another application may indicate a change in focus (e.g., a task switch) of the user which may result in entry of an unrelated query.

In response to determining that the initial query and the subsequent query are related, the system may associate at least the selected subsequent search result with the initial query (Operation 218). The association may be either a unidirectional (e.g., one-way) association or a bi-directional (e.g., two-way) association. In a unidirectional association, the system may determine that one or more search results associated with the subsequent query are relevant to the initial query, but that the search results of the initial query are not relevant to the subsequent query. Alternatively, in a bi-directional association, the system may determine that one or more search results associated with the subsequent query are relevant to the initial query, and that one or more search results of the initial query are relevant to the subsequent query.

Additionally, the system may determine whether the association is a peer-type association or a hierarchical association. In a peer-type association, each query is considered individually. That is, for the initial query, the subsequent query, and a third query, associations may exist between the initial query and the subsequent query, between the initial query and the third query, and/or between the subsequent query and the third query. In a hierarchical association, the system determines a hierarchical relationship between queries, where associations are made between hierarchical levels, (e.g., from parent to child), but not among queries of the same hierarchical level (e.g., between siblings). That is, for the initial query, the subsequent query, and a third query, the system may determine that the initial query and the third query are siblings, and that the subsequent query is a parent to both the initial query and the third query; associations may exist between the initial query and the subsequent query and between the subsequent query and the third query, but not between the initial query and the third query.

The determination of whether the association is peer-type or hierarchical may be separate from the determination of whether the association is unidirectional or bi-directional. Accordingly, the system may determine that a relationship is a unidirectional peer-type relationship, a bidirectional peer-type relationship, a unidirectional hierarchical relationship, or a bidirectional hierarchical relationship.

In some embodiments, associating at least the selected subsequent search result with the initial query can include configuring the system such that the selected subsequent search result is included in the initial search results returned in response to a query matching the initial query. Alternatively, associating at least the selected subsequent search result with the initial query may include determining that the selected subsequent search result is already included in the initial search results. In some embodiments, the system may associate the selected subsequent search result with the initial query by increasing a rank associated with the selected subsequent search result, such that the selected subsequent search result is more prominently featured in response to a query matching the initial query.

In some embodiments, the system may associate the selected subsequent search result with the initial query by adjusting a weight of one or more of the parsed query terms of the initial query and re-ranking the generated search results, such that a rank of the selected subsequent search result is increased. Adjusting the weight of one or more parsed query terms may include increasing a weight of a parsed query term and/or decreasing a weight of a parsed query term. For example, the system can determine weights to be associated with the one or more query terms of the initial query so that ranking the search results causes the selected subsequent search result to appear on a first page of search results, in the top five search results, or as the top search result. The weights associated with the one or more query terms may be adjusted in many ways.

Alternatively or additionally, the system may associate the selected subsequent search result with the initial query by adding one or more query terms to the set of parsed query terms generated in response to the initial query, such that a rank of the selected subsequent search result is increased. For example, the system may determine that addition one or more synonyms of a particular parsed query term would alter a ranking of the selected subsequent search result to cause the selected subsequent search result to appear on a first page of search results, in the top five search results, or as the top search result.

In embodiments, associating the selected subsequent search result with the initial query may be performed in response to selection (e.g., activation) of the selected subsequent search result. That is, selection of the selected subsequent search result indicates that a user viewed the content associated with the selected subsequent search result. Accordingly, selection of the link may be sufficient to determine that the selected subsequent search result should be associated with the initial query.

Alternatively, associating the selected subsequent search result with the initial query may be performed in response to the system determining that the selected subsequent search result has satisfied the subsequent query. For example, the system may associate the selected subsequent search result with the initial query following a determination that the user viewed the selected search result for a threshold period of time (e.g., reviewing information presented on a dashboard). As another example, the system may associate the selected subsequent search result with the initial query following a determination that the user interacted with a web page associated with the selected subsequent search result (e.g., filling out or submitting a form).

In some embodiments, the system may further compare the subsequent query to one or more intervening queries to determine if the subsequent query is similar to the intervening queries. In response to determining that one or more intervening query and the subsequent query are related, the system may associate at least the selected subsequent search result with the related intervening query.

In embodiments, the system may display content associated with the selected subsequent search result (Operation 208). In some embodiments, displaying the content may include displaying graphical data, textual data, video data, audio data, and/or the like.

In embodiments, the system may receive a new query that matches the initial search query. For example, the new query may be substantially identical to the initial query, may be a semantic match to the initial query, and/or may meet one or more similarity criteria with relation to the initial query. In response to receiving the new query, the system may provide new search results, including at least a subset of the initial search results and the selected subsequent search result.

4. Example Embodiment

Figure 3A:
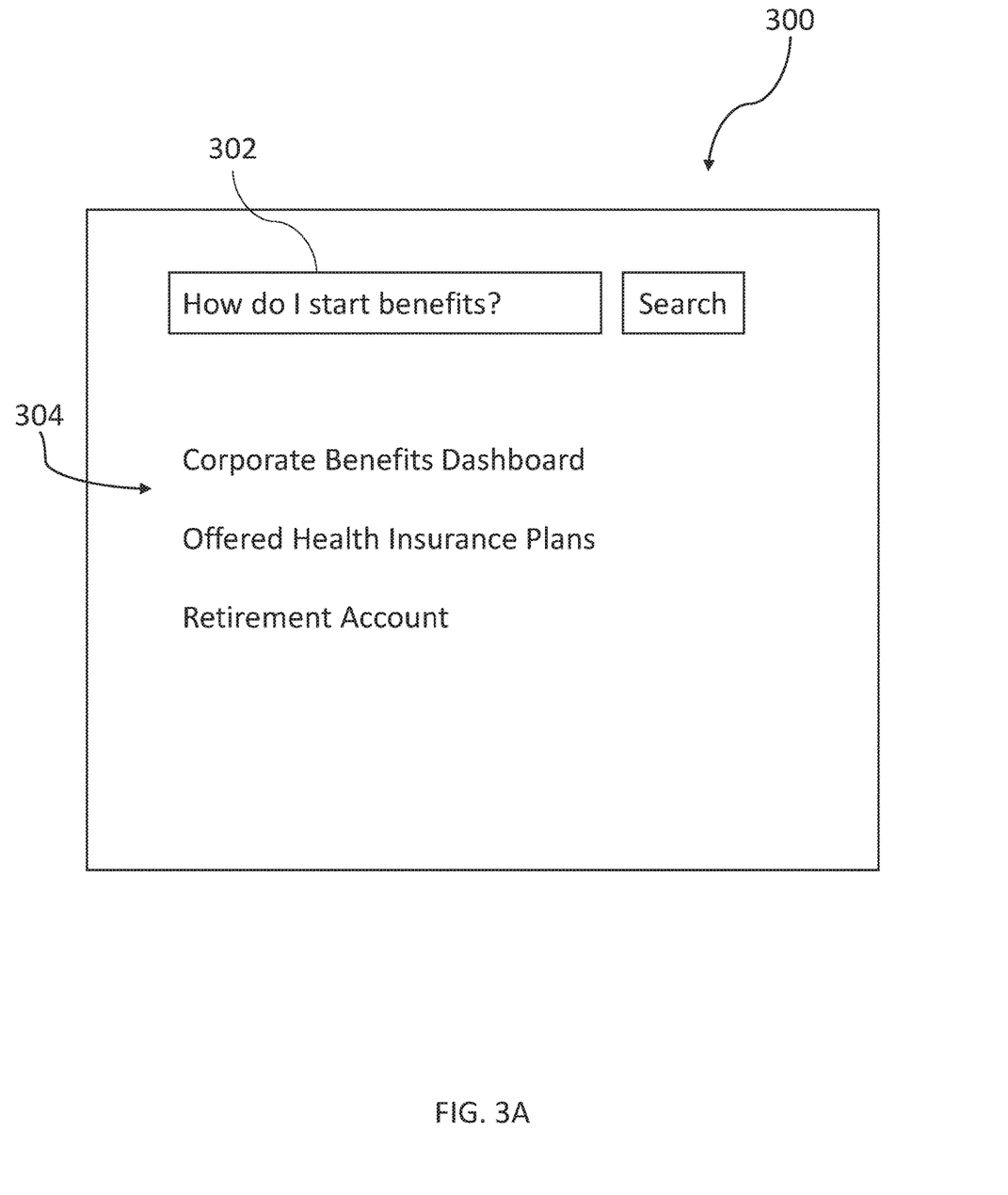
FIGS. 3A-3C show example user interfaces for illustrating functionality of a system in accordance with one or more embodiments.
Figure 3B:
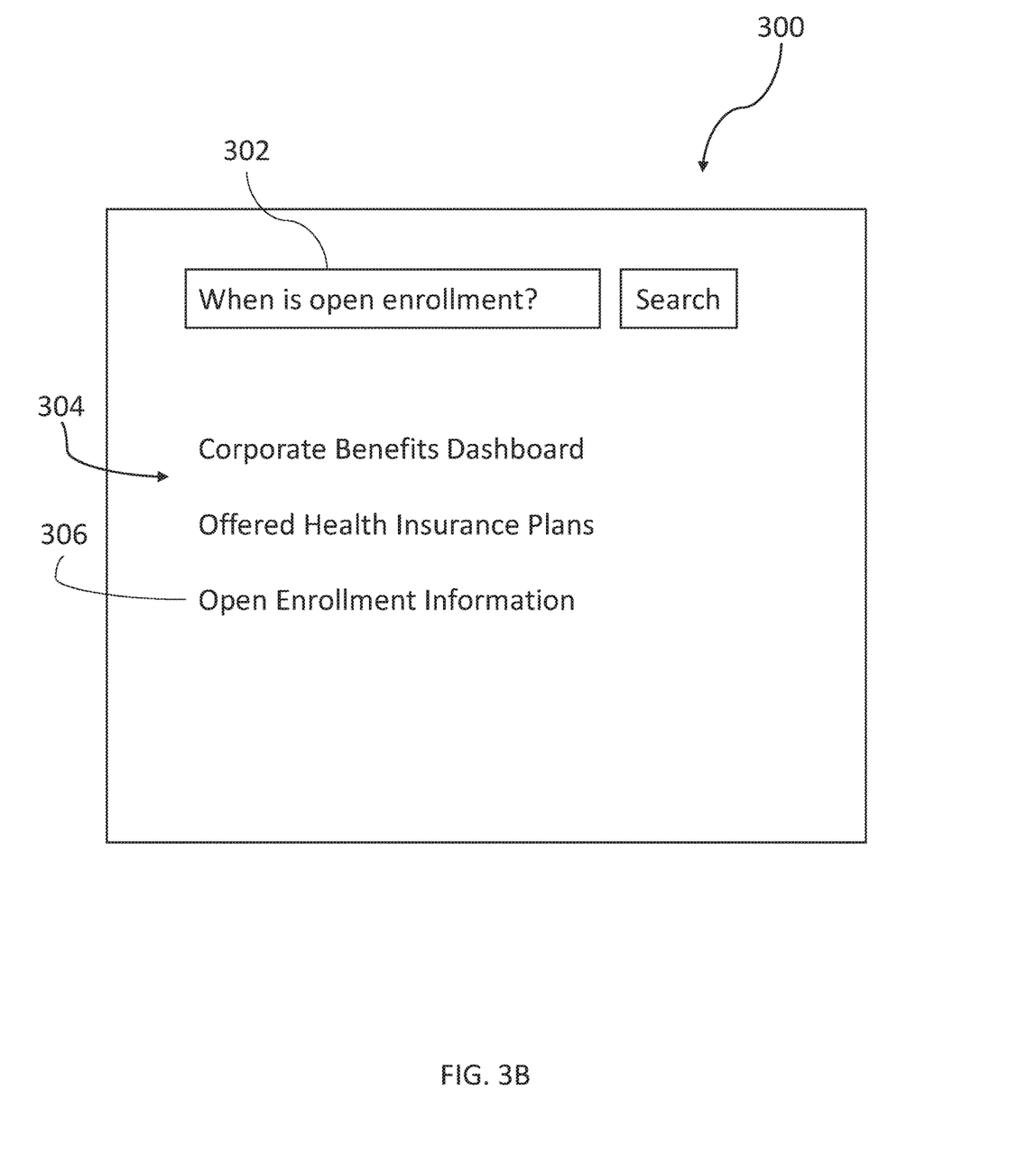
Figure 3C:
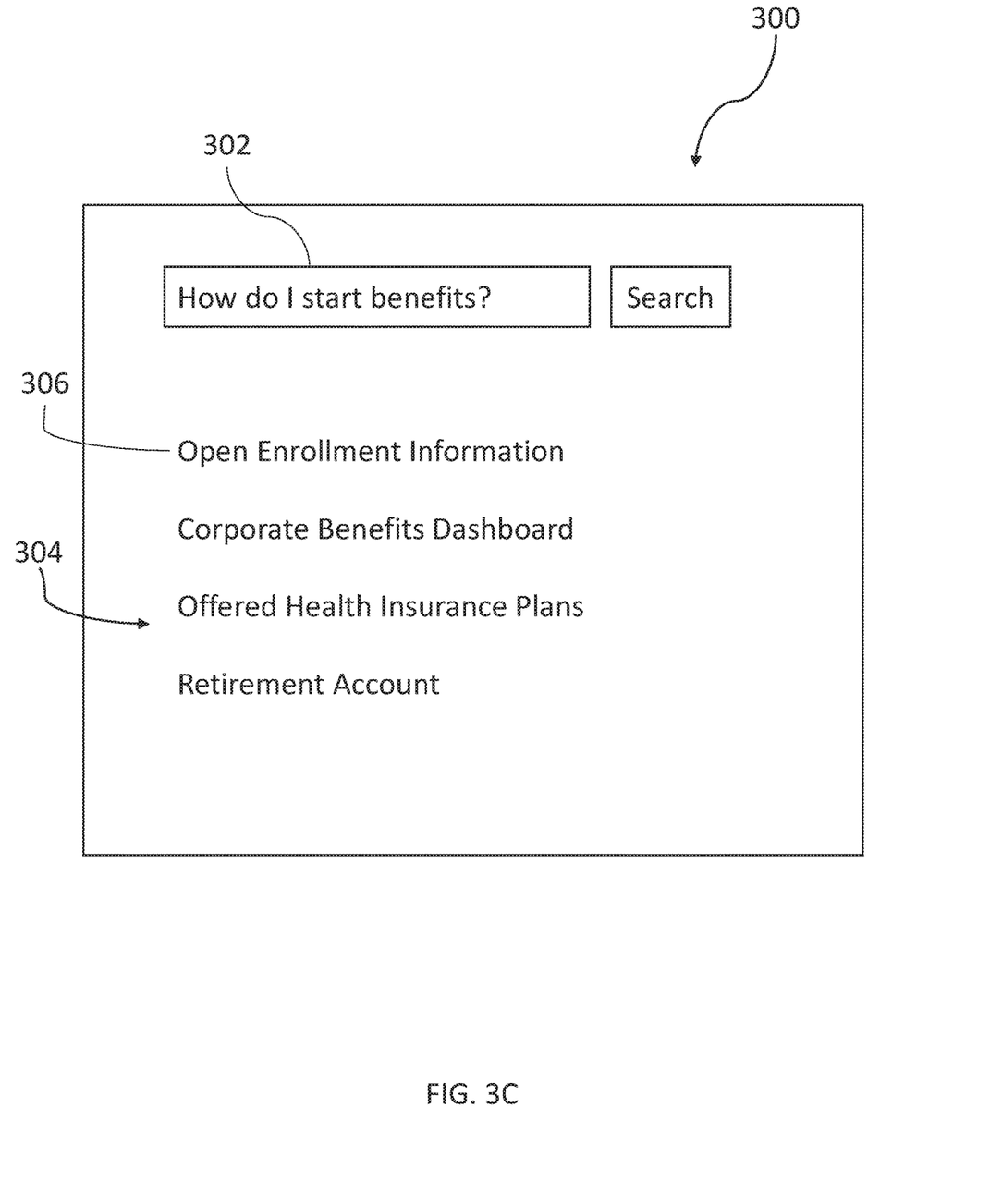

FIGS. 3A-3C show an example user interface 300 for interacting with a system that provides search results to a user.

As shown in FIG. 3A, a user may enter an initial query using a system interface. For example, a user may be looking for dates for enrollment in health insurance (e.g., an "open enrollment" process commonly offered by employers). The user may navigate an interface 300 to type a query into a search bar 302. As shown in FIG. 3A, the query may include the text "How do I start benefits?". In response to the entered query, the system may retrieve a first set of search results. That is, as described above, the system may parse the query to determine one or more query terms, and may select and ranks search results based on the parsed query terms.

The system may the system may display the ranked search results in the area 304. The search results may include, for example, a link to a corporate benefits page, a link to a web site describing health insurance plans offered by the employer, a link to a retirement account offered by an employer, and many other links related to employer benefits. However, the dates for enrollment in health insurance may not appear in the search results.

Because the user did not find the information they were seeking, the user may enter a subsequent query in the search bar 302. As shown in FIG. 3B, the subsequent query may include the text "When is open enrollment?". In response to the entered subsequent query, the system may retrieve a subsequent set of search results. That is, as described above, the system may parse the query to determine one or more query terms, and may select and ranks search results based on the parsed query terms.

The system may display the ranked subsequent search results in the area 304. The search results may include, for example, a link to a corporate benefits page, a link to a web site describing health insurance plans offered by the employer, and a link to a page about the employer's open enrollment. Thus, the user can select or otherwise activate the link to the page about the employer's open enrollment. The selected link is the selected subsequent search result 306.

Responsive to the user selecting the selected subsequent search result 306, the system may determine that the first search and the subsequent search are related. The determination may be made via a number of factors, including a time differential indicating an amount of time that elapsed between the first query and the subsequent query and/or a correspondence between the parsed query terms of the first search and the parsed query terms of the subsequent search. In response to determining that the first query and the subsequent query are associated, the system may associate the selected subsequent search result with the first search query.

Thereafter, when another user enters a new search query "How do I start benefits?" (e.g., a new search query meets a similarity criteria with relation to the first query), the search results returned by the system may include the selected subsequent search result 306, as shown in FIG. 3C.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 4:
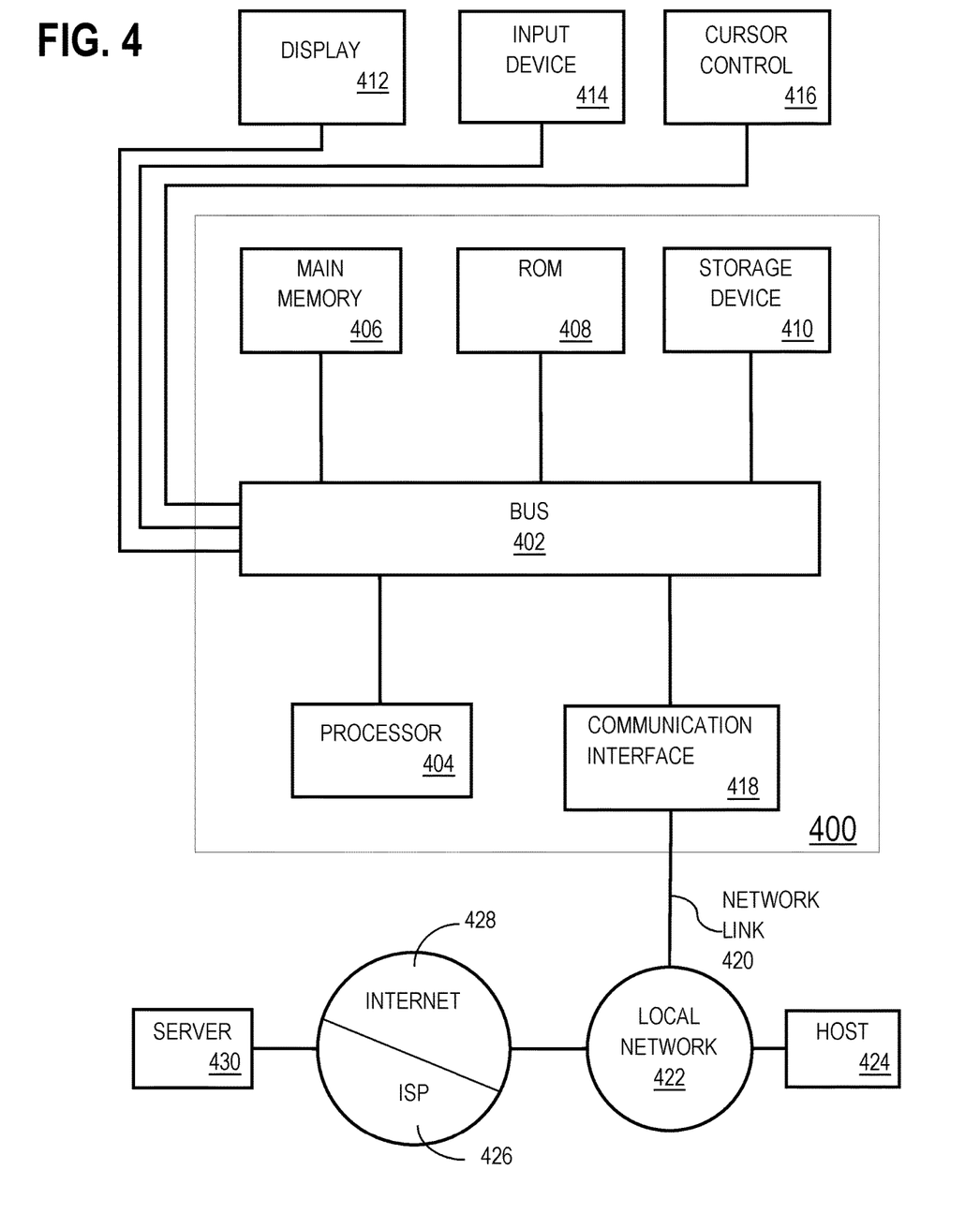
FIG. 4 shows a block diagram that illustrates a computer system in accordance with one or more embodiments.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 326, local network 322 and communication interface 418.

The received code may be executed by processor 404 as it is received, and/or stored in storage device 410, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory media comprising instructions which, when executed by one or more hardware processors, causes performance of operations comprising:
   receiving a first query from a user;
   responsive to receiving the first query: presenting a first set of one or more search results responsive to the first query;
   receiving a second query from the user;
   responsive to receiving the second query: presenting a second set of one or more search results corresponding to the second query;
   determining that a user selected a particular search result from the second set of search results corresponding to the second query, wherein the particular search result was not included in the first set of one or more search results corresponding to the first query;
   determining an association between the first query and the second query that satisfies a set of query relationship criteria, wherein the query relationship criteria require (a) execution of the first query within a threshold timeframe of the second query and (b) an indication that the user is not satisfied with the first set of one or more search results;
   responsive to determining (a) that the user selected a particular search result from the second set of search results corresponding to the second query and (b) the association between the first query and the second query that satisfies the set of query relationship criteria:
   associating the particular search result from the second set of search results with the first query, wherein the particular search result was not associated with the first query prior to the associating operation, wherein the particular search result is a chronologically first search result selected by a user subsequent to submission of the first query; and
   presenting at least the particular search result in response to a new execution of the first query.

2. The one or more non-transitory media of claim 1, wherein the indication that the user is not satisfied with the first set of one or more search results is detected responsive to determining that the user did not select any search result from the first set of search results.

3. The one or more non-transitory media of claim 1, further comprising instructions which, when executed by one or more hardware processors, causes performance of operations comprising:
subsequent to receiving the first query and the second query from the user, receiving a new query that meets a similarity criteria with relation to the first query;
responsive to receiving the new query: presenting at least the particular search result set from the second set of search results.

4. The one or more non-transitory media of claim 1, further comprising instructions which, when executed by one or more hardware processors, causes performance of operations comprising:
receiving a third query prior to the second query and subsequent to presenting the first set of one or more search results;
presenting a third set of one or more search results; and
determining that a user does not select any search result from the third set of search results.

5. The one or more non-transitory media of claim 4, further comprising instructions which, when executed by one or more hardware processors, causes performance of operations comprising:
determining a second association between the third query and the second query; responsive to determining the second association between the third query and the second query, associating at least the selected search result from the second set of search results with the third query.

6. The one or more non-transitory media of claim 1, wherein determining the association between the first query and the second query comprises:
separating the first query into one or more first query terms;
separating the second query into one or more second query terms; and
comparing the one or more first query terms and the one or more second query terms to determine that at least one term appears in both the first query and the second query.

7. The one or more non-transitory media of claim 1, wherein determining the association between the first query and the second query comprises:
presenting the first query and the second query to a human; and
receiving input indicating that the first query and the second query are related.

8. The one or more non-transitory media of claim 1, wherein associating at least the selected search result from the second set of search results with the first query comprises:
determining that the selected search result is not included in the first set of search results; and
adding the selected search result to the first set of search results.

9. The one or more non-transitory media of claim 1, wherein associating at least the selected search result from the second set of search results with the first query comprises:
determining that the selected search result is included in the first set of search results; and adjusting a ranking of at least the selected search result.

10. The one or more non-transitory media of claim 1, wherein the query relationship criteria further define a threshold percentage of executions of the first query followed by executions of the second query.

11. The one or more non-transitory media of claim 1, wherein the instructions further cause: determining whether the association between the first query and the second query is bi-directional or unidirectional; and responsive to determining that the association is bi-directional, associating at least one search result in the first set of search results with the second set of search results.

12. A system comprising:
at least one device including a hardware processor;
the system being configured to perform operations comprising:
receiving a first query from a user;
responsive to receiving the first query: presenting a first set of one or more search result responsive to the first query;
receiving a second query from the user;
responsive to receiving the second query: presenting a second set of one or more search results corresponding to the second query;
determining that a user selected a particular search result from the second set of search results corresponding to the second query, wherein the particular search result was not included in the first set of one or more search results corresponding to the first query;
determining an association between the first query and the second query that satisfies a set of query relationship criteria, wherein the query relationship criteria require (a) execution of the first query within a threshold timeframe of the second query and (b) an indication that the user is not satisfied with the first set of one or more search results;
responsive to determining (a) that the user selected a particular search result from the second set of search results corresponding to the second query and (b) the association between the first query and the second query that satisfies the set of query relationship criteria:
associating the particular search result from the second set of search results with the first query, wherein the particular search result was not associated with the first query prior to the associating operation, wherein the particular search result is a chronologically first search result selected by a user subsequent to submission of the first query;
presenting at least the particular search result in response to a new execution of the first query.

13. The system of claim 12, further configured to perform operations comprising:
receiving a third query prior to the second query and subsequent to presenting the first set of one or more search results;
presenting a third set of one or more search results; and
determining that a user does not select any search result from the third set of search results.

14. The system of claim 13, further configured to perform operations comprising:
determining a second association between the third query and the second query;
responsive to determining the second association between the third query and the second query, associating at least the selected search result from the second set of search results with the third query.

15. A method comprising:
receiving a first query from a user;
responsive to receiving the first query: presenting a first set of one or more search results responsive to the first query;
receiving a second query from the user;
responsive to receiving the second query: presenting a second set of one or more search results corresponding to the second query;
determining that a user selected a particular search result from the second set of search results corresponding to the second query, wherein the particular search result was not included in the first set of one or more search results corresponding to the first query;
determining an association between the first query and the second query that satisfies a set of query relationship criteria, wherein the query relationship criteria require (a) execution of the first query within a threshold timeframe of the second query and (b) an indication that the user is not satisfied with the first set of one or more search results;
responsive to determining (a) that the user selected a particular search result from the second set of search results corresponding to the second query and (b) the association between the first query and the second query that satisfies the set of query relationship criteria:
associating the particular search result from the second set of search results with the first query, wherein the particular search result was not associated with the first query prior to the associating operation, wherein the particular search result is a chronologically first search result selected by a user subsequent to submission of the first query;
presenting at least the particular search result in response to a new execution of the first query,
wherein the method is executed by at least one device comprising a hardware processor.

16. The method of claim 15, further comprising:
receiving a third query prior to the second query and subsequent to presenting the first set of one or more search results;
presenting a third set of one or more search results; and
determining that a user does not select any search result from the third set of search results.

17. The method of claim 16, further comprising:
determining a second association between the third query and the second query;
responsive to determining the second association between the third query and the second query, associating at least the selected search result from the second set of search results with the third query.

18. The method of claim 15, wherein determining the association is further responsive to determining that the user did not select any search result from the first set of search results.

19. The method of claim 15, further comprising:
subsequent to receiving the first query and the second query from the user, receiving a new query that meets a similarity criteria with relation to the first query;
responsive to receiving the new query: presenting at least the particular search result set from the second set of search results.

20. The method of claim 15, wherein determining the association between the first query and the second query comprises:
separating the first query into one or more first query terms;
separating the second query into one or more second query terms; and
comparing the one or more first query terms and the one or more second query terms to determine that at least one term appears in both the first query and the second query.

* * * * *